3,213,040
METHOD OF PREPARING AN EXTENDED CATALYST COMPOSITION CONSISTING OF COBALT OXIDE, MOLYBDENUM OXIDE AND ALUMINA
Chester L. Pedigo and Bruce T. Alexander, Louisville, Ky., assignors to Chemetron Corporation, Chicago, Ill., a corporation of Delaware
No Drawing. Filed Apr. 18, 1962, Ser. No. 188,541
6 Claims. (Cl. 252—465)

This application is a continuation-in-part of our application Serial No. 764,754, filed October 2, 1958, and now abandoned.

This invention relates generally to catalytic hydrogenation of petroleum stocks and fractions and more particularly to an improved cobalt-molybdenum-alumina catalyst suitable for hydrodesulfurization and other hydrogenation reactions and to the method of manufacturing such improved catalyst.

Many petroleum stocks contain sulfur compounds such as mercaptans, thiophenes and organic sulfides in small amounts, and these sulfur compounds have proved to be highly undesirable impurities, particularly when gasolines containing tetraethyl lead as an antiknock agent are to be produced. The presence of as little as about 0.05% sulfur in such fractions greatly increases the amount of tetraethyl lead which must be added in order to achieve a desired octane rating. Accordingly, it has been found to be desirable to reduce the sulfur content to around 0.01% (100 p.p.m.). Hydrodesulfurization is a convenient method of reducing the sulfur content to this range. This process involves reacting the organic sulfur compounds with hydrogen in the presence of a hydrogenation catalyst to convert the sulfur to hydrogen sulfide which may be readily separated from normally liquid fractions.

Compounds of cobalt and molybdenum have been used for many years for such hydrodesulfurization as well as other hydrogenation reactions and, because both of these metals are costly, many different forms of supported catalysts have been developed in which minor amounts of the catalytic materials are incorporated on carrier materials such as alumina.

The present invention is directed to a cobalt-molybdenum catalyst on an alumina carrier which can be extruded to form extrusions which after drying are extremely active in the hydrodesulfurization of petroleum stocks and which are physically strong and capable of high temperature regeneration without deterioration. Cobalt-molybdenum catalysts on alumina have been prepared in the past but such materials are virtually impossible to extrude in the form of strong cylindrical extrusions. For this reason, such catalysts in the past have usually been marketed in the form of pressed pellets. There are obvious economic advantages to the method of producing a catalyst by extrusion rather than by pelleting. Not only is the process considerably simplified, but equipment requirements are substantially less and the rate of production is significantly increased. A further advantage is that the catalyst prepared by extrusion according to the present invention has a lower density than tableted catalysts of the same cobalt and molybdenum composition.

Briefly, the present invention comprises a method of manufacturing extruded cobalt-molybdenum catalysts wherein alumina is the support material by adding a controlled amount of strong acid to the mixture of cobalt and molybdenum compounds with alumina. Sufficient water is added to reduce the mixture to a somewhat fluid consistency suitable for extrusion and the batch is passed through a suitable die, preferably of stainless steel, to form cylindrical or other shaped extrusions. The extruded material is then dried and/or calcined at high temperature to drive off the water and convert the cobalt and molybdenum compounds to oxides supported on the alumina carrier.

The method of catalyst manufacture which we have discovered for producing the novel extruded cobalt-molybdenum catalysts on an alumina support comprises mixing alumina hydrate and molybdenum oxide (or a molybdenum compound, such as molybdic acid or ammonium molybdate, which will form a molybdenum oxide when heated above about 600° F.) with an aqueous solution of a cobalt salt which is convertible to cobalt oxide upon calcination at the afore said temperature. In the preferred mixing procedure, the molybdenum and cobalt compounds are dispersed uniformly throughout the alumina and a damp solid mixture is formed. Then a strong mineral acid, such as nitric acid, hydrochloric acid or sulfuric acid, is added in a controlled amount to convert the damp solid into an extrudable paste. When the acid is nitric acid, the amount of acid selected should be at least 2.5% by weight of commercial concentrated (63%) acid, based on the total weight of the finished product, 5% to 10% being the preferred range. The amount of concentrated acid can exceed 10% by weight, as the excess is removed during calcination, but for reasons of economy such an excess is usually undesirable. With other mineral acids mole equivalent quantities of acid are selected. Sufficient water is added to the mixture, simultaneously and/or subsequently, to form an extrudable paste and the catalyst mixture is passed through a die or other apparatus to form extrusions which are then calcined at temperatures up to about 1,000° F. to evaporate the moisture, decompose the salts of cobalt and molybdenum, partially dehydrate the alumina and convert the extrusions into hard catalyst pellets which have great physical strength and will withstand repeated regeneration without appreciable deterioration. The preferred calcining temperature is in the range of 600° to 1,000° F. although higher temperatures not exceeding the sublimation temperature (approximately 2300° F.) of molybdenum trioxide may be used.

Certain variations from the above-described preferred procedure may be employed if desired. For example, the acid addition may be made simultaneously with rather than after incorporation of the cobalt and molybdenum compounds, if the compounds utilized are compatible with the acid used. Moreover, it is not necessary that the acid be highly concentrated at the time of addition and, if desired, all or some of the water added to adjust the composition to an extrudable paste may be mixed with the acid prior to addition of the acid to the mixture.

Catalysts produced in accordance with this general procedure have increased catalytic activity, particularly in the hydrodesulfurization of petroleum stocks and compare favorably with pelleted catalyst produced by more complicated and less efficient procedures. The procedure of this invention has the significant advantage of simplicity in that the catalyst materials may be incorporated in one mixing procedure and formed directly into suitable catalyst shapes without the added steps required for more conventional preparations.

The carrier or support material used in forming the extruded catalyst according to this invention is alumina. Preferred is a hydrated alumina, such as that containing approximately equal proportions of beta-$Al_2O_3 \cdot 3H_2O$ and alpha-$Al_2O_3 \cdot H_2O$ which upon calcination at a temperature in the range of 700° to 900° F. is converted largely to gamma-$Al_2O_3$. Other hydrated aluminas, such as alpha-$Al_2O_3 \cdot 3H_2O$, may be used in producing the catalyst. Likewise, calcined or otherwise dehydrated alumina can be used. During the calcination of the extruded alumina catalyst, high temperatures should be avoided or "dead burned" alumina may result. Accordingly, it is preferred to calcine the catalyst at a temperature in the range of 600° to 1,000° F. The amount of water used in preparing the extrudable paste is selected with regard to the consistency of the mixture after the acid has been added. A certain amount of water is added with the acid and the additional water which may be required to produce an extrudable mass is selected by simple experimentation to achieve a paste of the proper consistency.

The atomic ratio of cobalt to molybdenum in the catalysts may vary from 1:5 to 1:1. The relative quantities may be controlled by adjusting the amounts of molybdenum oxide and cobalt salt used in the initial steps of the catalyst manufacture. The cobalt salt may be any cobalt salt which is soluble in water and convertible to the oxide upon calcination, such as cobalt chloride, cobalt nitrate and cobalt sulfate. In practice it is preferred to dissolve cobalt metal in a suitable acid such as nitric acid to produce the solution of cobalt salt because in this way the amount of cobalt can be carefully controlled. The pH of the solution must be less than about 7 or the cobalt may precipitate prematurely. The amounts of catalytically active materials should usually be as small as possible consistent with the required activity to accomplish the desired reaction. The minimum amount may usually be determined with little difficulty by laboratory tests made upon the petroleum stock to be treated. Generally speaking, the amounts of cobalt and molybdenum in the catalyst will fall within the ranges given below:

|  | Percent by weight |
|---|---|
| Cobalt as CoO | 1 to 5 |
| Molybdenum as $MoO_3$ | 2 to 20 |

The remainder of the catalyst is carrier.

Cobalt-molybdenum catalysts made in accordance with this invention have demonstrated unusually high activity and stability, as well as long life. For instance, they consistently reduce the sulfur content of petroleum stocks from values greater than 1,000 p.p.m. to values near 200 p.p.m. at hourly liquid space velocities of 1. These results compare favorably with those obtained with cobalt-molybdenum catalysts made by conventional but more complicated procedures.

Certain of the following examples are illustrative of methods of preparing catalysts within the limits of this invention and also illustrate the activity of the catalysts thus prepared in dehydrosulfurization of petroleum stocks. These examples are given for the purposes of illustrating the invention but are not to be construed as limiting it in scope. It will be readily appreciated by those skilled in the art that numerous modifications in conditions, concentrations, relative quantities of materials and the like may be made without departing from the invention.

EXAMPLE 1

A mixture of 100 lbs. of hydrated alumina (27% water) and 9 lbs. of molybdenum trioxide were dry mulled together for approximately 20 minutes. The hydrated alumina comprises approximately equal proportions of beta-$Al_2O_3 \cdot 3H_2O$ and alpha-$Al_2O_3 \cdot H_2O$. Then 26.5 lbs. of an aqueous solution of cobalt nitrate (sp. gr. 1.196) containing 1.8 lbs. of CoO was added and the mixture wet mulled for approximately 10 minutes. The cobalt nitrate solution was prepared by dissolving cobalt metal in dilute nitric acid and controlling the excess of acid so that not more than 2% free acid was present. Next 2.5 lbs. of nitric acid (63%) diluted with water was added and wet mulling continued. Additional water (approximately 4.5 gal.) was added to give a paste of proper consistency for extrusion. The catalyst paste was then extruded through a 3/16 inch stainless steel die and the extrusions were calcined for 1 hour at 400° F., 1 hour at 650° F. and 6 hours at 950° F. The catalyst thus formed showed on analysis 2.5% CoO and 12.0% $MoO_3$. It had a side crush strength of 29 lbs. dead weight load (DWL), an abrasion loss of only 5.05% and a bulk density of 45.4 lbs. per cubic foot.

EXAMPLE 2

A cobalt-molybdenum-alumina extruded catalyst was prepared from the following materials:

|  | Parts |
|---|---|
| CoO (as cobalt nitrate solution) | 87.5 |
| $MoO_3$ | 300 |
| Alumina hydrate | 2850 |
| Nitric acid (63%) | 62.5 |

The alumina and molybdenum trioxide were dry mulled together for 10 minutes. The cobalt nitrate solution was added followed by the nitric acid (equivalent to 2.5% by weight of the finished product) and wet mulling was continued for a period of 2 hours. Then the consistency of the paste was adjusted by the addition of water to form an extrudable product which was extruded through a 3/16 inch die. The extruded material was calcined for 1 hour at 450° F., 1 hour at 650° F. and 6 hours at 950° F. On analysis the catalyst contained 3.4% CoO and 11.2% $MoO_3$. It had a side crush strength of 22 lbs. DWL, an abrasion loss of 11.0% and a bulk density of 41 lbs. per cubic foot.

EXAMPLE 3

An extruded cobalt-molybdenum-alumina catalyst was prepared as described in Example 2 except that the nitric acid was added in an amount equivalent to 5.0% by weight of the finished product. After calcining the extruded catalyst contained 3.6% CoO and 9.1% $MoO_3$, had a side crush strength of 14.3 lbs. DWL, an abrasion loss of 8.1% and a bulk density of 47 lbs. per cubic foot.

EXAMPLE 4

Another cobalt-molybdenum-alumina catalyst was prepared as described in Example 3 using the same quantities of materials. After calcination the product on analysis showed 3.2% CoO and 9.8% $MoO_3$. It had a side crush strength of 13.7 lbs. DWL, an abrasion loss of 14.2% and a bulk density of 50.6 lbs. per cubic foot.

EXAMPLE 5

A cobalt-molybdenum-alumina extruded catalyst was prepared precisely by the method of Example 1 using the same quantities of the same materials except that an amount of corn starch equivalent to 5% by weight of the finished product was added during the dry mulling operation. The catalyst was extruded through a 1/8 inch die and calcined according to the schedule of Example 1. The product on analysis showed 3.2% CoO and 9.7% $MoO_3$. It had a side crush strength of 12.1 lbs. DWL, an abrasion loss of 3.8% and a bulk density of 50 lbs. per cubic foot.

EXAMPLE 6

A cobalt-molybdenum-alumina extruded catalyst was prepared by the precise manner of Example 5, the sole change being that the extrusions were made through a 3/16 inch die. After calcining the product contained 3.3% CoO and 9.6% $MoO_3$. It had a side crush strength of 22 lbs. DWL, an abrasion loss of 5% and a bulk density of 49.9 lbs. per cubic foot.

Test procedure

The catalysts produced in Examples 1 to 6 were evaluated at standard diesel fuel test conditions according to the following procedure:

The test catalyst was first sulfided by placing a batch of catalyst pellets in a stainless steel tubular reactor surrounded by a jacket space containing heated Dowtherm. Hydrogen sulfide gas at atmospheric pressure was passed over the catalyst for a period of two hours during which time the temperature within the reactor was maintained at 700° F. by the heated Dowtherm in the jacket space. The purpose of subjecting the catalyst to hydrogen sulfide was to initially sulfide any portions of the catalyst susceptible of taking up sulfur in order to obtain more accurate readings in the following test of the catalyst's ability to desulfurize petroleum stock.

A straight run No. 2 diesel fuel containing about 1400 p.p.m. of organic sulfur was pumped through a preheater where the temperature was raised to 650–700° F. and then hydrodesulfurized over a 50 cc. bed of sulfided catalyst at 700° F. in the presence of hydrogen feed gas (80% hydrogen, 20% methane) at the rate of 1500 s.c.f./bbl. at 300 p.s.i.g. at liquid hourly space velocities of 1 and 3. (It is preferred to conduct comparative tests of this kind at somewhat higher space velocities than it is anticipated will be employed in commercial operation in order to obtain a better spread of results.)

The following are averages of results which were obtained in this test for the catalysts prepared above:

| Catalyst | Sulfur Content of Effluent, 1 L.H.S.V. | Sulfur Content of Effluent, 3 L.H.S.V. |
|---|---|---|
| | P.p.m. | P.p.m. |
| Ex. 1 | 63 | 231 |
| Ex. 2 | | 145 |
| Ex. 3 | | 174 |
| Ex. 4 | | 136 |
| Ex. 5 | | 150 |
| Ex. 6 | | 228 |

Certain modifications in the method of this invention such as will present themselves to those familiar with the art may be made without departing from the scope thereof. For example, if desired, nickel oxide may be incorporated in place of some of the cobalt oxide in the finished catalyst by substituting a nickel compound for some of the cobalt compound in the formula and obtaining a cobalt-nickel-molybdenum catalyst.

We claim:

1. A method of preparing an extruded cobalt-molybdenum catalyst which comprises forming a mixture of alumina, a compound of molybdenum which after heating provides molybdenum oxide, a cobalt compound which after heating provides cobalt oxide, at least about 2.5% and not more than about 10% by weight, based on finished product, of a strong mineral acid and sufficient water to form a paste of proper consistency for extrusion, extruding said paste through an orifice to form an extruded catalyst and calcining said catalyst at a temperature in the range of 400° F. to about 1000° F. to evaporate water, to at least partially activate the alumina by driving off water of hydration, and to stabilize the cobalt and molybdenum by converting compounds of these metals to their respective oxides.

2. The method of claim 1 wherein the alumina contains 20% to 35% water of hydration.

3. The method of claim 2 wherein the atomic ratio of cobalt to molybdenum is in the range of 1:5 to 1:1.

4. The method of claim 3 wherein the alumina is a mixture of beta-$Al_2O_3 \cdot 3H_2O$ and alpha-$Al_2O_3 \cdot H_2O$.

5. The method of claim 4 wherein the acid is nitric acid.

6. A method of preparing an extruded cobalt-molybdenum-alumina catalyst which comprises mixing 100 parts of hydrated alumina containing approximately equal proportions of beta-$Al_2O_3 \cdot 3H_2O$ and alpha-$Al_2O_3 \cdot H_2O$, 1.5 parts to 3.0 parts of CoO, 5 to 15 parts of $MoO_3$ and 2.5 to 10 parts of concentrated nitric acid with sufficient water to form a paste of extrudable consistency, extruding said catalyst paste through a die and calcining said catalyst at a temperature in the range of 700° to 1,000° F.

References Cited by the Examiner

UNITED STATES PATENTS

| | | | |
|---|---|---|---|
| 2,697,683 | 12/54 | Engel et al. | 252—470 X |
| 2,753,310 | 7/56 | Riedl | 252—467 X |
| 2,755,236 | 7/56 | Robinson | 252—474 |
| 2,793,986 | 5/57 | Lanning | 252—470 X |
| 2,915,478 | 12/59 | Erickson | 252—470 X |
| 2,963,449 | 12/60 | Nixon | 252—470 X |
| 3,020,243 | 2/62 | Reitmeier | 252—465 |
| 3,020,244 | 2/62 | Dienes | 252—465 |
| 3,020,245 | 2/62 | Reitmeier | 252—465 |
| 3,075,915 | 1/63 | Arnold et al. | 252—465 X |
| 3,104,228 | 9/63 | Vance et al. | 252—465 |

FOREIGN PATENTS 776,102  6/57  Great Britain.

OTHER REFERENCES

Gardner et al.: Chemical Synonyms and Trade Names, 5th Edition, The Technical Press Ltd., London, England, 1948, page 218.

Rose et al.: The Condensed Chemical Dictionary, Sixth Edition, Reinhold Publishing Corporation, New York, 1961, page 497.

MAURICE A. BRINDISI, *Primary Examiner.*